A. L. REED & T. S. GETTLE.
CHEESE CUTTER.
APPLICATION FILED JAN. 4, 1909.

1,142,622.

Patented June 8, 1915.
3 SHEETS—SHEET 1.

WITNESSES:

INVENTORS
Alfred L. Reed and
Thomas S. Gettle
BY
Thompson Bell
ATTORNEY

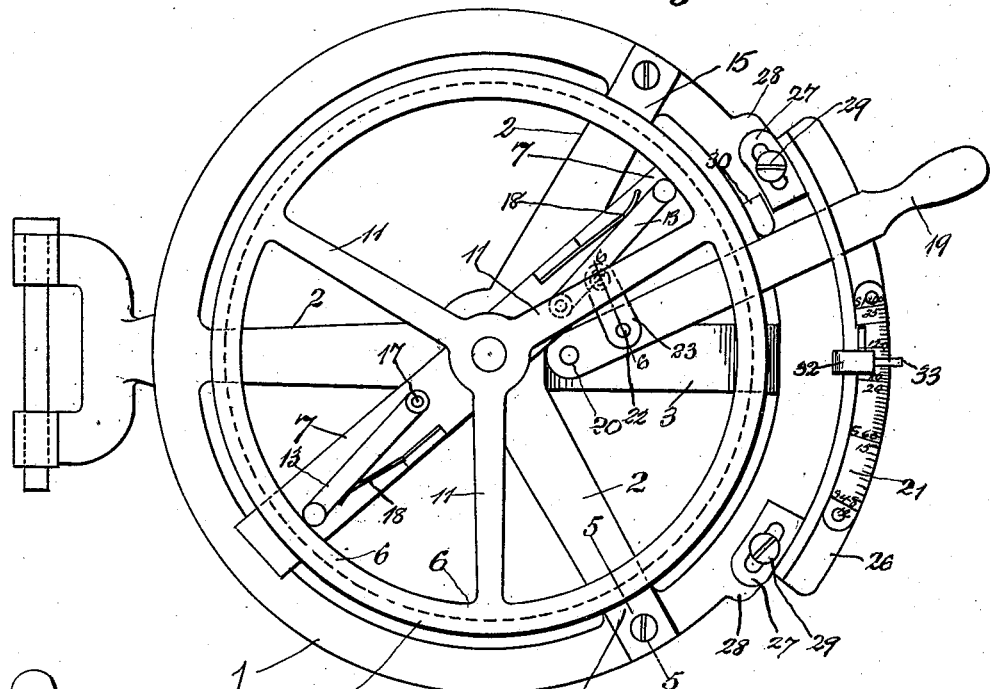
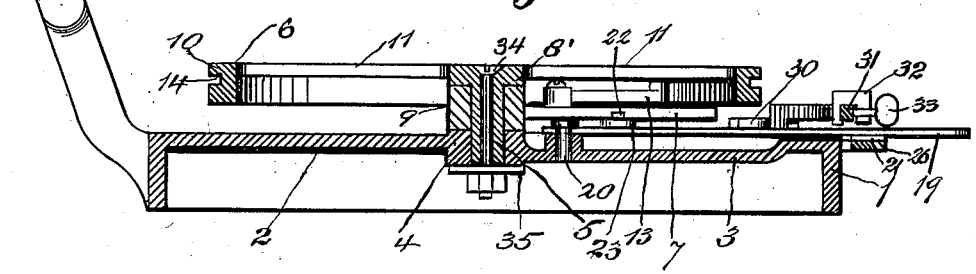
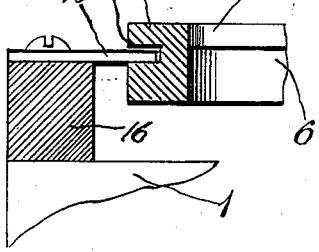

A. L. REED & T. S. GETTLE.
CHEESE CUTTER.
APPLICATION FILED JAN. 4, 1909.
1,142,622.
Patented June 8, 1915.
3 SHEETS—SHEET 3.
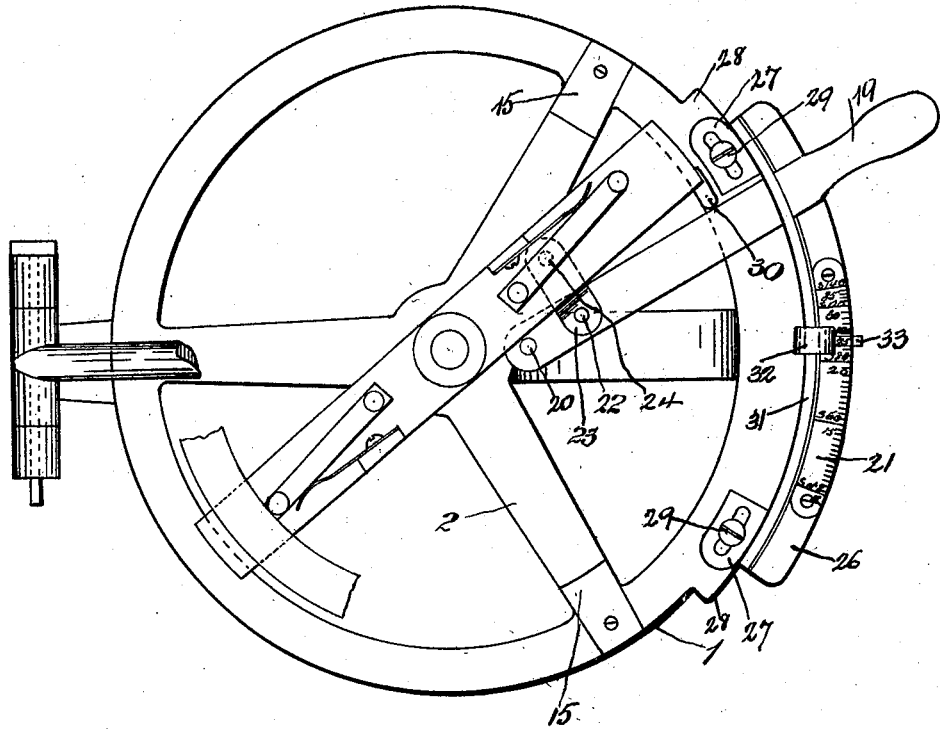
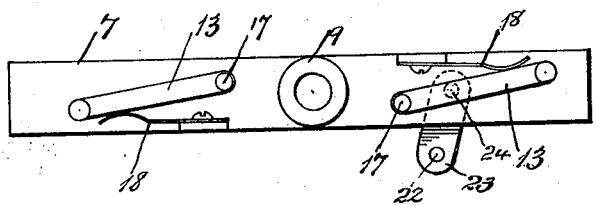

UNITED STATES PATENT OFFICE.

ALFRED L. REED AND THOMAS S. GETTLE, OF ANDERSON, INDIANA; SAID GETTLE ASSIGNOR TO SAID REED.

CHEESE-CUTTER.

1,142,622.   Specification of Letters Patent.   Patented June 8, 1915.

Application filed January 4, 1909. Serial No. 470,643.

*To all whom it may concern:*

Be it known that we, ALFRED L. REED and THOMAS S. GETTLE, citizens of the United States, residing at Anderson, in the county of Madison and State of Indiana, have invented certain new and useful Improvements in Cheese-Cutters, of which the following is a specification, reference being had therein to the accompanying drawing.

This invention relates to a machine for cutting and dividing cheese into portions of predetermined sizes or weights and consists in a cheese-dividing apparatus as hereinafter described in the specification and particularly pointed out in the claims.

The main features of this invention resides in the mechanism for imparting an intermittent motion to and controlling the intermittent motion of the cheese carrying table to move equal fractional portions of a revolution, so that a cheese situated on said table may be accurately divided into equal portions.

The objects of this invention are to provide an improved mechanism for cheese cutters whereby a cheese may be more accurately divided into slices or portions of predetermined sizes or weights, and also to simplify the construction and operation of such mechanism. We attain these objects by means of the mechanism illustrated in the accompanying drawings in which like numerals of reference designate like parts throughout the several views.

Figure 1:
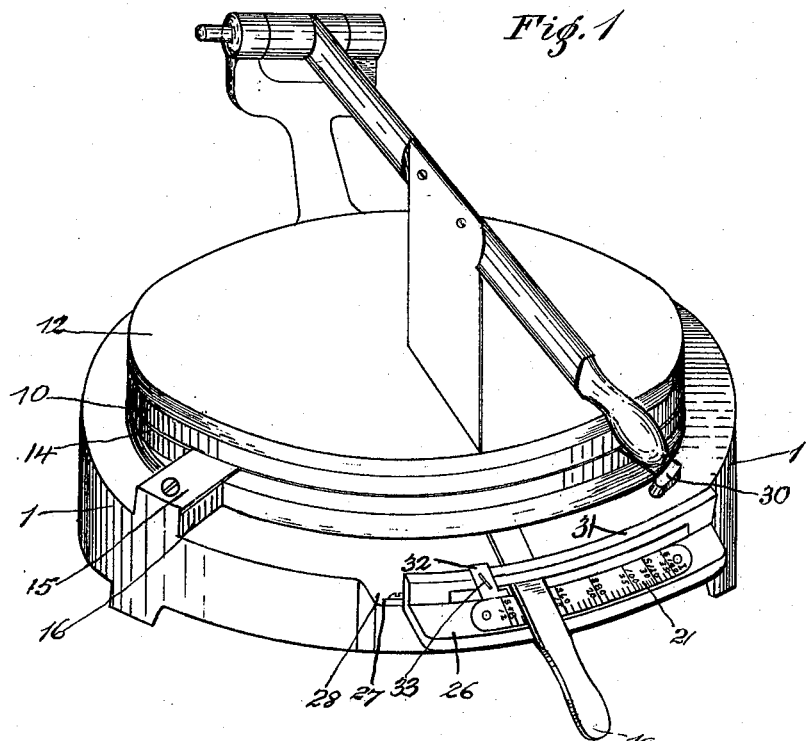
Figure 2:
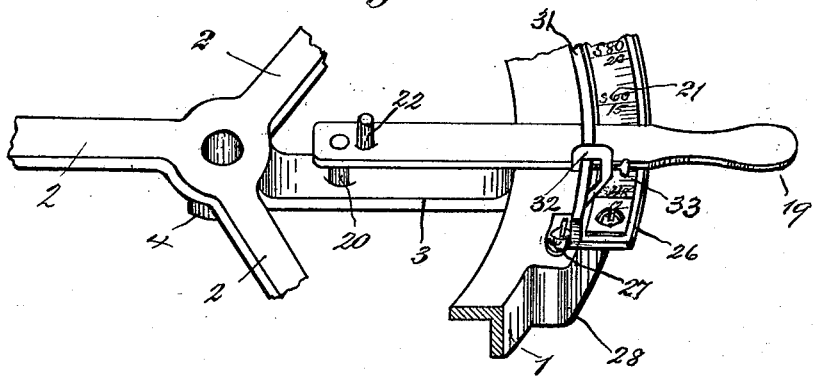

Figure 1 is a perspective view of our invention of a cheese cutter; Fig. 2 is a detail broken perspective view of the base of the apparatus and showing the setting lever thereof; Fig. 3 is a top plan of the apparatus omitting the cheese carrying table and cheese cutting knife in order to exhibit the actuating mechanism of said cheese carrying table; Fig. 4 is a vertical central sectional view of the apparatus minus the cheese cutting knife; Fig. 5 is an enlarged detail broken-off sectional view of a portion of the table carrying means showing the brake spring whereby the inertia of the carrier is arrested and taken along the line 5—5 in Fig. 3; Fig. 6 is an enlarged detail sectional view of the setting and actuating levers showing the connecting link thereof whereby the actuating lever is connected to the setting lever and taken along the line 6—6 in Fig. 3; Fig. 7 is a top plan of the apparatus omitting the cheese carrying table and its carrier so as to exhibit the actuating lever and the setting lever and the manner of operatively connecting the same; and Fig. 8 is an enlarged detail view of the actuating lever showing the friction mechanism thereof.

The supporting base 1 of this apparatus is preferably of a circular form and is provided with the radially extending arms 2 and 3 which support the boss 4 situated centrally of the base and formed integral with said arms. The boss 4 is provided with a vertical bore into which is fitted to turn the axial shaft 5 of the table carrier 6. The actuating clutch carrying lever 7 is situated horizontally under the table carrier 6 between the top of the base I and the boss 8' of said carrier, and said lever is provided with the boss 9 which is situated intermediate the ends thereof, said boss projecting above and below the top and bottom sides of said lever. The boss 9 is provided with a central bore adapted to fit and to pivot on the shaft 5 under the boss 8' of the table carrier 6. The table carrier 6 is composed of the rim 10, the central boss 8', upon the boss 9 and from the under side of which extends the axial shaft 5, and the integral arms 11 which extend radially from the boss 8' to the rim 10, and upon the top side of said carrier rests the cheese table 12 which is preferably of wood. The carrier rim 10 is turned on its inner side to form a true surface to be readily engaged by the contacting ends of the friction clutches 13 of the clutch carrying lever 7. The outer edge of the carrier rim 10 is provided with a peripheral groove 14 the lower edge of which groove forms a friction surface upon which the brake springs 15 are adapted to bear. The brake springs 15 are preferably of a resilient metallic material and are secured on the supports 16, which latter are formed integral on the base 1, and said springs are provided to operate as brakes for controlling the motion of said carrier when the latter is revolved by its actuating mechanism. The upper peripheral portion of the rim extends above and over said frictional contact face and prevents the dropping of débris upon the face.

The friction clutches 13 are pivoted on the top side of the clutch carrying lever 7 by the pins 17, which latter are situated equally distant from the axis of the shaft 5 at opposite sides thereof and in such position that the engaging ends of said clutches will engage the inner true surface of the rim 10 to grip the latter, when the clutch carrying lever 7 is moved in one direction, to simultaneously revolve the table carrier 6 in the same direction. Clutch retaining-springs 18 are secured on said clutch lever 7 in such position thereon that their free ends will firmly press against said clutches 13 to maintain the engaging ends thereof in contact with the rim 10.

The setting and actuating lever 19 is pivotally mounted at one end thereof on one of the radial arms 3 of the base 1 by a pin 20, and said lever extends from its pivotal end outwardly and beyond the base 1 to sweep over the face of the scale 21. A pivot pin 22 connects one end of the link 23 to the lever 19 relatively near to the pin 20, and the opposite end of said link is connected by the pin 24 to the lever 7, the latter pin being provided with a retaining collar 25 whereby said link is held pivotally in position on said pin, and the latter is permanently secured to said actuating lever to depend therefrom, so that when the carrier 6 and the clutch carrying lever 7 are required to be removed, the link 23 and its pin 24, being connected to said clutch carrying lever 7, may be detached from the base 1 without disturbing or disconnecting the actuating lever 19 and the parts connected thereto from said base. The scale bar 26, upon which the scale 21 is secured, is provided with the slotted lugs 27 which bear upon and are fitted to the projecting portion 28 of the base 1, and said lugs are secured to said base by the securing screws 29, so that said scale bar and the scale plate 21 which is secured upon it, may be adjusted and set in position relatively to the setting lever fixed stop 30 formed integral with the base 1. A guide bar 31 is formed integral with the scale bar 26 and extends over the top of the actuating and setting lever 19, and on said guide bar is mounted a stop 32 which is adjustably secured thereon by a thumb nut 33.

The scale plate 21 is divided on its surface into graduations and provided with numbers representing the weights of various sizes of cheeses and the number of slices or portions into which a cheese may be divided; thus, suppose a cheese to weigh twenty five pounds, and it is required to divide it into portions weighing each one fourth pound; then the adjustable stop 32 is set to the graduation marked twenty five pounds on one side of said graduation and one hundred slices on the other side of the graduation of the scale plate 21, so that the actuating lever 19 may be swung in the space between said adjustable stop 32 and the fixed stop 30 to revolve the cheese carrying table to divide the cheese into the number of portions designated upon the scale regardless of the weight of the portion. If it is desirable to divide any size of cheese irrespective of its weight or rate per pound at which it may be sold, into any number of desired portions, which may be sold at any price, the adjustable stop 32 is set to that graduation of the scale 21 designating the number of slices or portions into which the cheese must be divided, and the actuating lever 19 may be moved from the adjustable stop 32 to the fixed stop 30 to revolve the cheese, situated upon the cheese carrying table, a space equal to the required division. Suppose it is required to divide a cheese weighing twenty five pounds total weight into one hundred and twenty slices or portions, irrespective of the weight of each portion, then the adjustable fixed stop 30 is set to the graduation on the scale designated one hundred and twenty slices and thirty pounds, and the apparatus may be operated to divide a twenty five pound cheese into one hundred and twenty portions irrespective of the price at which each portion may be sold. Suppose a cheese weigh fifty pounds total weight and it is required to divide said cheese into one hundred equal portions by weight, the adjustable stop 32 is set to the graduation on the scale designated one hundred on the graduated scale plate 21; thus, the said cheese may be divided into one hundred portions, each portion weighing one hundredth part of the whole, or one half pound.

The axial shaft 5 of the carrier is provided with a central bore into which is fitted a retaining bolt 34, the tapered head of which is fitted into the correspondingly formed counter bore situated at the top end of said bore, so that the flat top side of said head will be flush with the top surface of the carrier when said bolt is in place. A washer 35 is secured at the bottom end of said shaft 5 to retain said shaft and said carrier in position.

If from any cause, such as accident or wear, the operating mechanism of the cheese table becomes deranged after leaving the factory, so that the cheese cannot be divided accurately as desired, the scale plate 21 should be readjusted on the base 1 relatively to the fixed stop 30, in the required direction as experience in operation will indicate; and thus with an occasional readjustment of the scale plate alone to compensate for lost motion of the clutch and connecting devices the life of the machine may be indefinitely prolonged in an economical manner.

We claim:

1. In a cheese cutter, the combination of a base, a table carrier rotative on the base, clutch devices mounted on the base to engage the carrier, an operating lever pivotally mounted on the base and coöperating with the clutch devices to rotate the carrier, a graduated scale bar on the base provided with means for indicating the extent of movement of the lever in one direction, and a stop device on the scale bar to stop the lever at an indicated position, with means enabling the indicating means to be variably supported relatively to the base and permitting re-adjustment of the stop device relative to the base, a stop on the base to limit the movement of the lever in the opposite direction, and a knife mounted on the base.

2. In a cheese cutter, the combination of a base, a stop fixed on the base, a table carrier rotatively mounted on the base, a clutch-carrying lever pivotally connected with the base, a friction-clutch device mounted on the clutch-carrying lever in contact with the carrier, a graduated scale bar having two portions thereof adjustably secured to the base and permitting the bar to be shifted longitudinally relatively to the fixed stop, a stop device adjustably secured relatively to said scale bar, and an operating and setting lever pivotally connected with the base and extending movably between the fixed stop and the stop device, with means operatively connecting the operating and setting lever with the clutch-carrying lever, and a knife mounted on the base.

3. In a cheese cutter, the combination with a base having a central boss, a knife mounted on the base, and an operating and setting lever pivoted on the base, of a clutch-carrying lever supported on the central boss and connected with the operating and setting lever, a table carrier supported on the clutch carrying lever and having an axial shaft thereon extending through the lever and into the central boss rotatively, a friction-brake mounted on the base and in contact with the carrier, friction-clutch devices mounted on the clutch-carrying lever in contact with the carrier, and a graduated scale bar and also a stop device mounted on the base and one of which is adjustable on the base relative to the other to compensate for distortion of the connections between the operating and setting lever and the clutch-devices, said scale bar being beneath and said stop device being opposite one side of said operating and setting lever, and a stop device adjustably secured on said scale bar opposite the opposite side of said operating and setting lever.

4. In a cheese cutter, the combination with a base comprising an annular rim, a knife mounted on the base, a stop fixed on the rim, two securing screws connected to the rim, one screw being in proximity to said stop and the other remote therefrom, a table carrier and a clutch-carrying lever rotatable on the base, an operating and setting lever pivoted on the base and connected with said clutch-carrying lever, and clutch devices mounted on the clutch-carrying lever in contact with said table carrier, of a graduated scale bar provided with lugs seated adjustably on said rim and having each a longitudinally-extending slot therein receiving one of said screws, said screws adjustably securing said lugs to said rim with said scale bar adjacent said setting lever, and a stop adjustably secured to said scale bar.

5. In a cheese cutter, the combination with a base, a table carrier and a clutch-carrying lever rotative on the base, an operating and setting lever pivoted on the base and connected with the clutch-carrying lever, friction-clutch devices mounted on the clutch-carrying lever in contact with said carrier, and a stop fixed on said base opposite one side of said setting lever, of a scale bar secured to said base beneath said setting lever and having a guide bar thereon extending above said setting lever, and a scale plate secured to said scale bar and having progressively varying graduations marked thereon and provided with different numbers representing the weights of different sizes of cheeses and also numbers indicating the number of slices or portions into which cheeses of different sizes may be divided, a stop device adjustably secured to said guide bar opposite the opposite side of said operating and setting lever, and means enabling said scale bar and stop device adjustably mounted thereon to be moved from their normal position.

6. In a cheese cutter, the combination with a base, a table carrier rotative on the base, a stop fixed on the base, an operating lever pivotally mounted on the base opposite the stop, a clutch device coöperating with the operating lever and the carrier to rotate the carrier, and a knife mounted on the base, of a scale bar provided with means for indicating the extent of movement of the operating lever from the stop, a stop device for the lever adjustably secured to the scale bar, and means for adjustably securing the scale bar to the base to permit adjustment of the indicating means relative to the fixed stop.

7. In a cheese cutter, the combination with a base, a table carrier rotatably mounted on the base, an operating lever pivoted on the base, and a clutch device coöperating with the lever and the carrier for rotating the carrier, of a graduated scale bar and also a stop device mounted on the base and one of which is adjustable on the base relative to the other to compensate for distortion of the connections between the operating lever and the table carrier, said scale bar being beneath and said stop device being opposite one side of said operating lever, and a stop device adjustably secured on said scale bar opposite the opposite side of said operating lever.

8. In a cheese cutter, the combination of a base, a table carrier rotatable on the base, an operating and setting lever pivotally connected to the base, clutch means coöperating with the lever and the carrier for enabling the lever to periodically rotate the carrier, a stop fixed on the base on one side of said lever, a scale bar arranged under said lever and secured to said base, a scale plate secured to said scale bar and having progressively varying graduations marked thereon and provided with different numbers representing the weights of different sizes of cheeses and also numbers indicating the number of slices or portions into which the cheeses of different sizes may be divided, and a stop device adjustably supported relative to said scale plate and opposite the opposite side of said lever.

In testimony whereof we affix our signatures in presence of two witnesses.

ALFRED L. REED.
THOMAS S. GETTLE.

Witnesses:
WM. TAYLOR,
FREDERICK VAN NUYS.

Copies of this patent may be obtained for five cents each, by addressing the "Commissioner of Patents, Washington, D. C."